March 4, 1930.  L. D. HOULIS  1,749,248
OIL BURNER
Filed Nov. 14, 1927  2 Sheets-Sheet 1

Inventor
L. D. Houlis.
By Jack & Ashley
Attorney

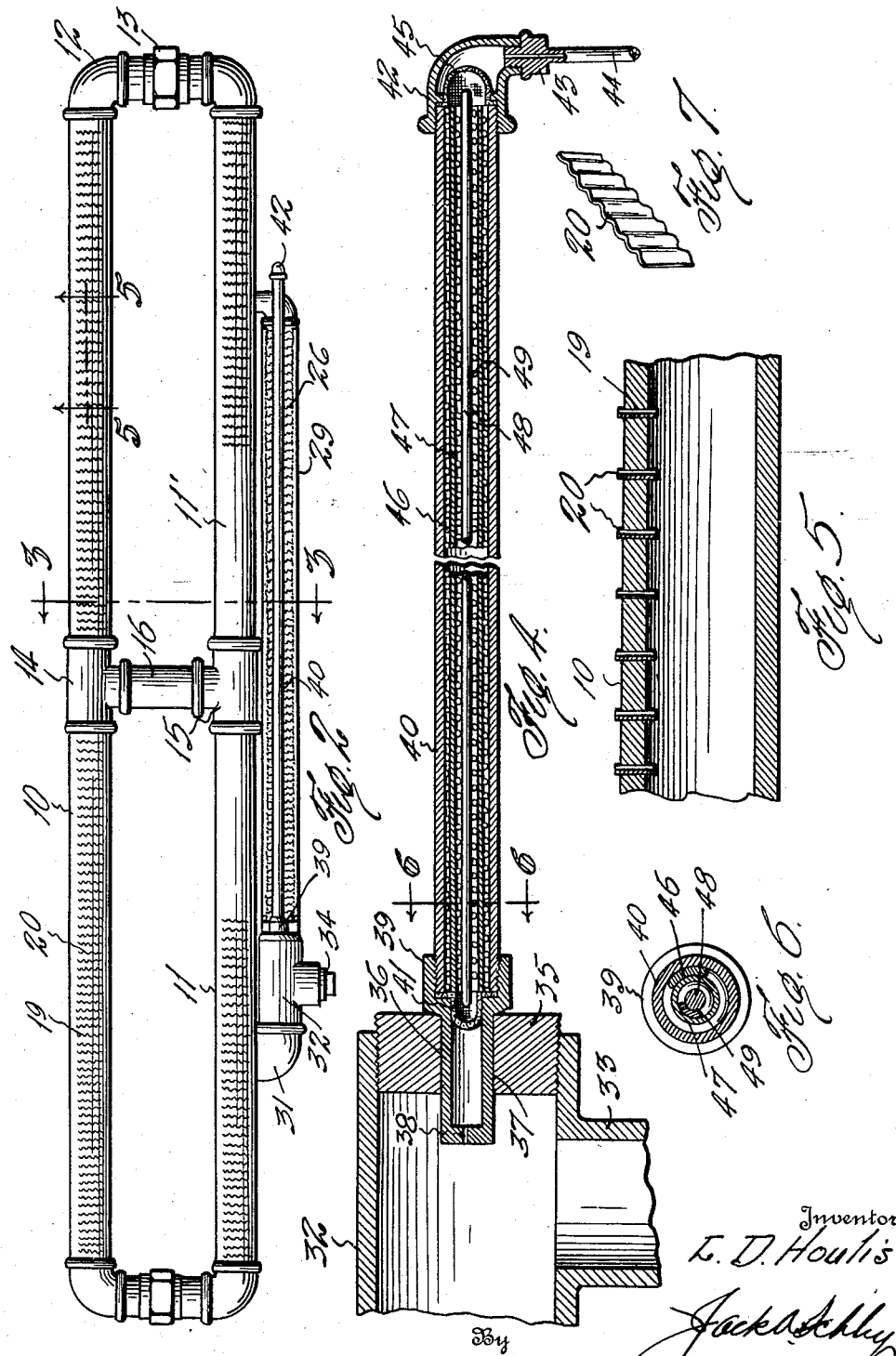

Patented Mar. 4, 1930

1,749,248

UNITED STATES PATENT OFFICE

LOUIS D. HOULIS, OF DALLAS, TEXAS

OIL BURNER

Application filed November 14, 1927. Serial No. 233,282.

This invention relates to new and useful improvements in oil burners.

One object of the invention is to provide an oil burner for using kerosene and similar fuel liquids in an economical, efficient and satisfactory manner, whereby an even distribution of heat and a steady flame, particularly suitable for baking purposes, is had.

A particular object of the invention is to provide a trap whereby condensed liquids are automatically drained from the burner, thus freeing the various parts and connections from such liquids which would otherwise interfere with the operation and prevent proper combustion.

A further object of the invention is to provide an economical and efficient retort or generator together with a mixing chamber and a clean-out opening.

A construction designed to carry out the invention will be hereinafter described, together with other features of the invention.

The invention will be more readily understood from a reading of the following specification and by reference to the accompanying drawings, in which an example of the invention is shown and wherein:

Fig. 2 is a plan view of the burner.

Fig. 4 is a sectional view of the retort or generator tube and the air mixer,

Fig. 5 is an enlarged longitudinal sectional view taken on the line 5—5 of Fig. 2.

Fig. 6 is an enlarged cross-sectional view taken on the line 6—6 of Fig. 4,

Fig. 7 is a perspective view of one of the burner slugs,

Figure 1:
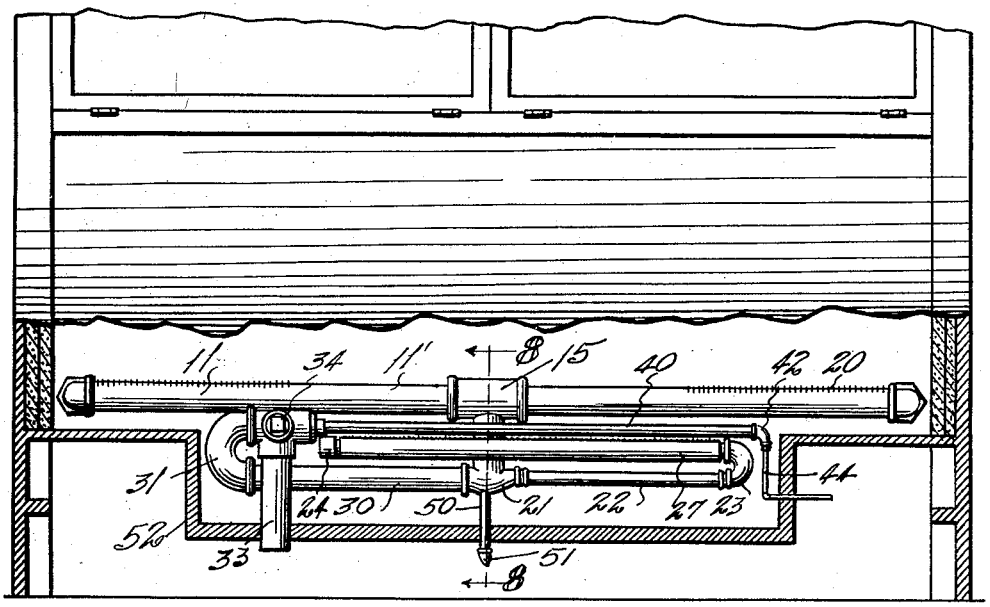
Fig. 1 is a view showing a burner constructed in accordance with the invention, installed in the bottom of a baking oven, portions being shown in elevation and portions in section.

In the drawings the numeral 10 designates an elongated burner tube which is parallel to and spaced from an elongated burner tube 11, both preferably in the same horizontal plane. The tubes are connected at their ends by elbows 12 and couplings 13 so that they may be readily assembled or taken apart when necessary. At its center the tube 10 has connected there in a T 14, while a similar T 15 is connected in the burner tube 11 and these T's are connected by a short pipe or tube 16. The T 15 has a depending collar 17 at right-angles to the pipe connection 16 for receiving a gas supply tube 18.

Gas supplied to the T 15 is distributed from each end of the T into the tube 11 and into the pipe 16 from which it is discharged into the T 14 and escapes from each end of the latter into the tube 10. Gas may also pass from one burner tube to the other through the elbows 12 and couplings 13.

I have found that very satisfactory results can be obtained by providing the burner tubes 10 and 11 with transverse kerfs 19 properly spaced in their upper surfaces and driving into said kerfs crimped slugs 20, as is best shown in Figs. 5 and 7. The slugs provide vertical ports and permit the use of comparatively wide kerfs which do not clog as easily as the very narrow slits usually employed. The crimped slugs will, of course, obstruct the kerfs and sufficiently retard the escape of the gas to provide highly efficient burner orifices. It will be noted that in the tube 10 the kerfs extend up to each side of the T 14, while in the tube 11 imperforate portions 11' are provided on each side of the T 15. This is done to equalize the distribution of the gas, as will be obvious.

Figure 3:
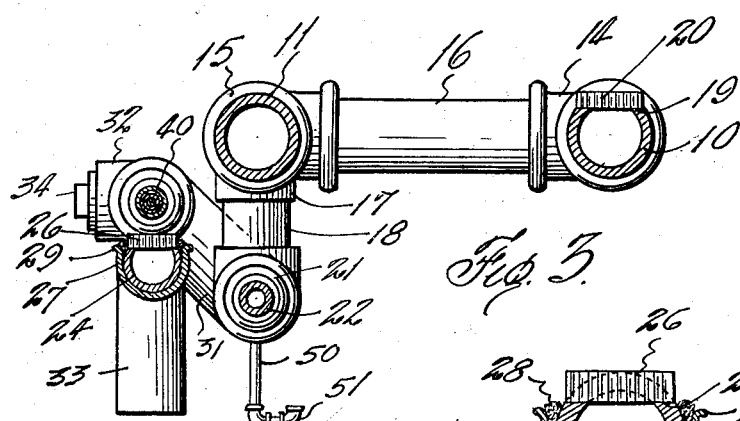
Fig. 3 is an enlarged cross-sectional view taken on the line 3—3 of Fig. 2.
Figure 9:
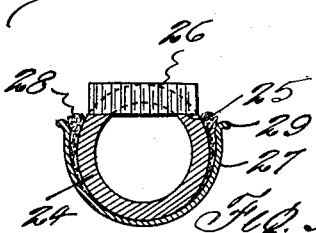
Fig. 9 is a detail of the retort burner.
Figure 8:
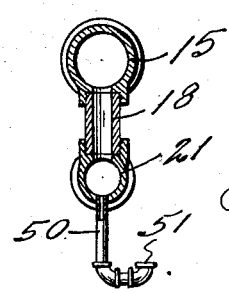
Fig. 8 is a vertical sectional view taken on the line 8—8 of Fig. 1.

A reducing T-member 21 is fastened on the bottom of the pipe 18. From the reduced end of this member a small fuel pipe 22 extends longitudinally under the tube 11 and is connected at its end to an elbow 23, which latter is inclined upwardly and outwardly and is connected with a retort burner tube 24 extending longitudinally in front of the pipe 18. As is best shown in Figs. 2, 3 and 9, the burner tube 24 is provided with kerfs 25 and slugs 26 like the tubes 10 and 11. A metal jacket 27 is secured around the tube 24 and asbestos strips 28 are placed between the jacket and the tube contiguous to the ends of the kerfs for pre-heating purposes. The jacket is provided with longitudinal flanges 29 to form a trough or pan so that the asbestos strips may be saturated with alcohol or any other suitable pre-heating fluid.

A gas supply tube 30 extends from the member 21 in the opposite direction to the tube 22 and is considerably larger than the latter. An inclined elbow 31 connects the end of the tube 30 with a mixing box 32, which may be made in the form of an enlarged T having one end screwed into the elbow. The T is provided with a depending air-admitting stem 33 and has an opening in its front side normally closed by a clean-out plug 34.

A bushing 35 is screwed into the forward end of the box 32 and the shank 36 of a nozzle has a snug sliding fit in an aperture 37 in said bushing so as to extend into the chamber of the box 32, as is best shown in Fig. 4. A small orifice 38 is provided in the protruding end of said shank. The nozzle has an enlarged head 39, bearing against the outer side of the bushing for receiving one end of a generator sleeve 40.

A strainer 41 confined by the sleeve extends into the bore of the shank. A reducing elbow 42 is screwed onto the opposite end of the sleeve and receives a nipple 43 which is fastened on the end of a tubular conductor 44 through which kerosene or other fuel oil is supplied. A strainer 45 is positioned in the elbow contiguous to the end of the sleeve 40.

A wire coil 46 surrounds a tube 47 within the sleeve 40. A small rod 48 passing centrally through the tube 47 is surrounded by a second wire coil 49 within said tube. The fuel oil which is delivered to the elbow 42 passes through the strainer 45 and enters the sleeve 40 and the tube 47. The direct passage of the oil through the sleeve and tube is retarded by the coils 46 and 49 so that said oil is caused to take a circuitous path and the heating of the parts will cause said oil to be vaporized, which vapor will discharge through the screen 41 and be projected through the orifice 38 into the chamber of the box 32.

Air admitted through the stem 33 and mixing with the vapor in the box 32 will form a gas which will be drawn down into the tube 30 and then upward through the parts 21, 18 and 17 and distributed to the burner tubes 10 and 11, as hereinbefore described. A portion of the gas will also pass through the tube 22 to the generator burner 24. Owing to the differences in temperature and also the condition of the air admitted through the stem 33, there will be more or less condensation throughout the burner. The condensate will, of course, take the form of a liquid and unless some means for carrying off the same is provided, the burner parts would in time fill to such a point as to interfere with the operation of the burner. It will be noted that the T-connection 21 is at the lowest point of the burner and all liquids will drain to this connection. From the bottom of said connection, a small pipe 50 leads downwardly to a goose neck trap 51 open at one end. Sufficient liquid is maintained in the trap to provide a seal so that the gas can not escape.

It is obvious that condensation liquids will drain to the connection 21 and pass down through the pipe 50 to the trap 51 which will overflow, thus carrying off said liquids. The condensate liquids may be caught in a suitable receptacle and the fuel oil filtered out and recovered.

In operating the burner, the asbestos strips 28 are saturated with alcohol which is ignited and the generator sleeve and its internal parts thereby pre-heated. Kerosene or other fuel oil is fed under pressure through the conductor 44 to the elbow 42 when the generator has been heated to the required point. The liquid oil upon passing through the coils 46 and 49 and coming in contact with the heated sleeve 40, tube 47 and rod 48, will be vaporized. This vapor will be ejected through the orifice 38 into the chamber of the mixing box 32. Air admitted through the stem 33 will be admixed with the vapor and a combustible gas thus formed. If the orifice 38 should become clogged the plug 34 may be removed and said orifice cleaned with a suitable wire.

The gas from the mixing box is conducted downwardly by the elbow 31 through the tube 30 to the T-member 21. A portion of the gas is carried through the tube 22 to the generator burner 24 and the major portion of the gas is discharged into the pipe 18 and conducted to the T 15. The gas is distributed from the T 15 into the burner tube 11 and by way of the pipe 16 and T 14 to the burner tube 10. The imperforate portions 11' will cause an equal distribution of the gas. The flame will be maintained at the kerfs 19, the gas being discharged through the crimps of the slugs 20.

In Fig. 1 I have shown the burner positioned in the bottom of a baker's oven which is provided with a sump 52 for containing the parts below the tubes 10 and 11. The oil conductor 44 is carried through one side of the sump, while the stem 33 and the pipe 50 extend through the bottom of said sump. This illustration merely shows one use of the burner and the invention is not to be limited thereto.

Various changes in the size and shape of the different parts, as well as modifications and alterations, may be made within the scope of the appended claims.

What I claim, is:

1. In an oil burner, a pair of substantially parallel burners connected at their ends and intermediate thereof, a generator tube extending longitudinally at one side of the burner tubes and having a vaporizing element therein, a secondary gas burner beneath the generator and parallel with the burner tubes, a mixing chamber communicating with the discharge from the generator and having an air intake, a gas conductor from said chamber extending parallel to and beneath one burner tube and having a connection therewith at substantially its midlength, and a reduced conductor extended from said connection and communicating with the secondary burner at the intake end of the generator tube.

2. An oil burner as defined by claim 1, and a condensation pipe depending from said connection and formed with an upturned discharge to retain a liquid body and prevent escape of vapor.

In testimony whereof I affix my signature.

LOUIS D. HOULIS.